United States Patent
Yerli

(10) Patent No.: US 12,361,514 B2
(45) Date of Patent: Jul. 15, 2025

(54) SYSTEM AND METHOD FOR TRANSMISSION AND RECEIVING OF IMAGE FRAMES

(71) Applicant: TMRW Group IP, Luxembourg (LU)

(72) Inventor: Cevat Yerli, Dubai (AE)

(73) Assignee: TMRW Group IP, Luxembourg (LU)

( * ) Notice: Subject to any disclaimer, the term of this patent is extended or adjusted under 35 U.S.C. 154(b) by 276 days.

(21) Appl. No.: 17/894,083

(22) Filed: Aug. 23, 2022

(65) Prior Publication Data
US 2024/0070806 A1    Feb. 29, 2024

(51) Int. Cl.
*G06T 5/50*  (2006.01)
*G06T 3/4007* (2024.01)

(52) U.S. Cl.
CPC .............. *G06T 3/4007* (2013.01); *G06T 5/50* (2013.01)

(58) Field of Classification Search
CPC ....... G06T 3/4007; G06T 5/50; G06T 3/4053; G06T 7/20; G06N 3/0455; H04N 21/234381; H04N 21/440281; H04N 19/167; H04N 19/59; H04N 19/172;
(Continued)

(56) References Cited

U.S. PATENT DOCUMENTS

| | | |
|---|---|---|
| 10,284,432 B1 | 5/2019 | Kuo et al. |
| 2018/0204111 A1 | 7/2018 | Zadeh et al. |
| 2020/0184278 A1 | 7/2020 | Zadeh et al. |

(Continued)

FOREIGN PATENT DOCUMENTS

| | | |
|---|---|---|
| CN | 107295264 A | 10/2017 |
| CN | 109903578 A | 6/2019 |

(Continued)

OTHER PUBLICATIONS

Foco, M. et al., "Zoom, Enhance, Synthesize! Magic Upscaling and Material Synthesis using Deep Learning;" NVIDIA, Mar. 1, 2017, pp. 1-76.

(Continued)

*Primary Examiner* — Stephen P Coleman
(74) *Attorney, Agent, or Firm* — BRYAN CAVE LEIGHTON PAISNER LLP

(57) ABSTRACT

A system for the transmission and receiving of data comprising: a sending unit configured to receive frames of an object of interest, the sending unit comprising: a frame selector creating selected frames by selecting frames from the frames of the object of interest at set intervals, the frames not selected by the frame selector remaining on the sending unit; an encoder generating from the selected frames, selected frame latent vectors being a compressed representation of the frames of the object of interest; the sending unit sending the selected frame latent vectors to a receiving unit. The receiving unit, configured to receive the selected frame latent vectors, comprises: an interpolator reconstructing by interpolation a number of in-between latent vectors between two successive selected frame latent vectors; the interpolator sending both the received selected frame latent vectors and reconstructed in-between latent vectors to a decoder; and the decoder decoding both the received selected frame latent vectors and reconstructed in-between latent vectors and generating frames.

17 Claims, 14 Drawing Sheets

(58) Field of Classification Search
CPC .... H04N 19/587; H04N 19/132; H04N 19/20; H04N 19/42
USPC .......................................................... 382/300
See application file for complete search history.

(56) References Cited

U.S. PATENT DOCUMENTS

| | | | |
|---|---|---|---|
| 2020/0244969 A1* | 7/2020 | Bhorkar | G06N 3/045 |
| 2020/0258196 A1 | 8/2020 | Kokura | |
| 2020/0380263 A1 | 12/2020 | Yang et al. | |
| 2021/0136320 A1 | 5/2021 | Zatloukal | |
| 2021/0150187 A1 | 5/2021 | Karras et al. | |
| 2021/0304357 A1 | 9/2021 | Bae et al. | |

FOREIGN PATENT DOCUMENTS

| | | |
|---|---|---|
| CN | 109949203 U | 6/2019 |
| CN | 209676393 U | 11/2019 |
| CN | 209785026 U | 12/2019 |
| CN | 210136592 U | 3/2020 |
| CN | 210757752 U | 6/2020 |
| CN | 211606671 U | 9/2020 |
| DE | 19737354 A1 | 3/1999 |
| DE | 19737355 A1 | 3/1999 |
| EP | 0535684 A1 | 4/1993 |
| EP | 0541949 A2 | 5/1993 |
| JP | 1288191 A | 11/1989 |
| JP | 3-145878 A | 6/1991 |
| JP | 2020010331 A | 1/2020 |
| KR | 10-1256340 B1 | 4/2013 |
| KR | 1020190130479 A | 11/2019 |
| WO | 2013001013 A1 | 1/2013 |
| WO | 2021048498 A1 | 3/2021 |

OTHER PUBLICATIONS

Li, Z., et al., "Generate Identity-Preserving Faces by Generative Adversarial Networks," arXiv:1706.03227v2 [cs.CV], Jun. 25, 2017, pp. 1-9.

Rajasekar, B, TokBox Inc, "AI and the dawn of WebRTC real-time communications," YouTube, Aug. 28, 2017. URL: https://www.youtube.com/watch?v=Les0YntK6T0 [searched on Aug. 8, 2022], 9 pages.

Sharma, S, "AI Can See Clearly Now: GANs Take the Jitters Out of Video Calls," URL: https://blogs.nvidia.com/blog/2020/10/05/gan-video-conferencing-maxine/ [searched on Aug. 8, 2022], 5 pages.

* cited by examiner

SYSTEM AND METHOD FOR TRANSMISSION AND RECEIVING OF IMAGE FRAMES

FIELD

The disclosure relates to the field of data compression and transmission. In particular, the current disclosure relates to a system and method for sending and receiving data, as well as to corresponding sending and receiving units and computer-readable media thereof.

BACKGROUND

Since the start of the internet, there has been a large increase in the amount of data being transmitted worldwide. The transmission of video content has accounted for an ever-increasing portion of the data transmitted. This is especially so with the advent of the Covid virus. More and more people are working from home. There has been a great increase in the need to use video conferencing facilities. This includes the need for people located remotely from each other to communicate by means of video.

Communicating by video however necessitates the transfer of large amounts of data. This again requires that the transmission and receiving facilities have large bandwidths. This makes the transmission of video images expensive. There is therefore a demand for video and audio compression in order to reduce the required bandwidth during the transmission phase of video images and audio. What is required is a system and method for image or video and audio transmission that reduces the bandwidth required during the transmission of the video images and audio.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a system comprises a sending unit comprising a processor and memory, the sending unit configured to receive image frames of an object of interest, the sending unit being programmed to implement modules comprising: a frame selector configured to select image frames from the image frames of the object of interest at set intervals; and an encoder configured to generate selected frame latent vectors from the selected frames, the selected frame latent vectors being a compressed representation of the image frames of the object of interest; wherein the sending unit is further programmed to send the selected frame latent vectors to a receiving unit comprising a processor and memory. The receiving unit is configured to receive the selected frame latent vectors and is programmed to implement modules comprising an interpolator configured to reconstruct by interpolation a number of in-between latent vectors between two successive selected frame latent vectors; wherein the interpolator is configured to send both the received selected frame latent vectors and reconstructed in-between latent vectors to a decoder; and the decoder is configured to decode both the received selected frame latent vectors and reconstructed in-between latent vectors and generate image frames of the object of interest from the selected frame latent vectors and the in-between latent vectors, including image frames corresponding to image frames of the object of interest that were not selected by the frame selector. In some embodiments, the output of the decoder provides a smooth representation as if all of the frames had been sent from the encoder.

The number of reconstructed in-between latent vectors may be the same as the image frames not selected by the frame selector, or the number of reconstructed in-between latent vectors may not be the same as the image frames not selected by the frame selector.

The sending unit may be further programmed to implement an image reducer configured to reduce the image size of the image frames. The image reducer may be further configured to reduce the image size by removing the background from the image frames (e.g., so that only the object of interest remains in the frames). The image reducer may be further configured to reduce the image size by separating the object of interest and background in the frames; and perform different kinds of compressions by performing higher resolution compression on the object of interest in each image frame and performing lower resolution compression on the background in each image frame, thereby achieving a reduction in image size while allocating greater resolution to what is of greater interest to a typical observer, in which the object is at a higher resolution and the background is at a lower resolution.

The sending unit may also be further programmed to implement an image enhancer configured to enhance the image of the image frames. The image enhancer may be further configured to enhance the image by detecting an object of interest in the image frames; and upscaling the object of interest in size in the sending unit, wherein such upscaling comprises increasing the resolution of the object of interest. The sending unit may send the image frame with the upscaled object of interest to the receiving unit. The upscaled object of interest may then be downscaled in size at the receiving unit.

The receiving unit may have an additional latent vector generator, which may be located before the interpolator in the data processing flow, configured to generate additional replacement vectors to replace damaged or missing latent vectors not received by the receiving unit.

The system may comprise a plurality of sending units and receiving units, wherein the plurality of sending units send a corresponding plurality of selected frame latent vectors to the plurality of receiving units via a selective forwarding unit (SFU), the SFU being configured to: receive the plurality of selected frame latent vectors; select which receiving units to send the plurality of selected frame latent vectors; and forward the corresponding latent frame latent vectors to the selected receiving units.

In another aspect, a sending unit comprising a processor an memory is configured to receive frames of an object of interest, the sending unit being programmed to implement modules comprising: a frame selector configured to select image frames from the frames of the object of interest at set intervals; an encoder configured to generate selected frame latent vectors from the selected frames, the selected frame latent vectors being a compressed representation of the frames of the object of interest; wherein the sending unit is further programmed to send the selected frame latent vectors to a destination.

The destination may be a storage medium, and the selected frame latent vectors may be stored on the storage medium. The sending unit may be further programmed to implement an image reducer that reduces the image size of the image frames. The sending unit may also be further programmed to implement an image enhancer that is used to enhance the image of the image frames.

In one embodiment, when the system is employed to compress and transmit data between a plurality of sending and receiving units, e.g., between 10 and 20 participants, the system uses a selective forwarding unit (SFU) architecture. The SFU architecture may implemented as computer programs stored in memory of at least one server computer connected to the plurality of sending and receiving units via the network and may be executed by at least one processor of the at least one server computer. In this embodiment, the SFU receives the streams including the encoded latent vectors from the plurality of sending units, selects which receiving units to send each media stream, and forwards the corresponding media streams to the selected receiving units. The rest of the process may continue as described previously at the receiving unit. By using an SFU architecture, the system of the current disclosure may expand its capabilities from just a couple of users to a larger number than would be suitable with just a peer-to-peer architecture.

In another embodiment, when the system is employed to compress and transmit data between a plurality of sending and receiving units, e.g., beyond 20 participants, the system uses a media combining unit (MCU) architecture. The MCU architecture may implemented as computer programs stored in memory of at least one server computer connected to the plurality of sending and receiving units via the network and may be executed by at least one processor of the at least one server computer. In this embodiment, the MCU receives the streams including the encoded latent vectors from the plurality of sending units, decodes the media streams, rescales them, and composes a new stream from all of the received streams before sending to corresponding receiving units. The rest of the process may continue as described previously at the receiving unit. By using an MCU architecture, the system of the current disclosure may be used for a large number of participants, such as above 20 participants.

In another aspect, a receiving unit comprising a processor and memory is programmed to receive selected frame latent vectors and to implement modules comprising: an interpolator configured to reconstruct by interpolation a number of in-between latent vectors between two successive selected frame latent vectors, and to send both the received selected frame latent vectors and reconstructed in-between latent vectors to a decoder; and the decoder, the decoder being configured to decode both the received selected frame latent vectors and reconstructed in-between latent vectors and to generate image frames of an object of interest from the selected frame latent vectors and the in-between latent vectors.

The number of reconstructed by interpolation in-between latent vectors may be the same as the frames not selected by the frame selector, or the number of reconstructed by interpolation in-between latent vectors may not be the same as the frames not selected by the frame selector. The selected frame latent vectors may be stored on a storage medium, and the receiving unit may receive the selected latent frame vectors by retrieving them from the storage medium. In some embodiments, the selected frame latent vectors are received from a sending unit.

In another aspect, a method performed by a computer system comprising one or more computing devices comprises: receiving image frames of an object of interest; selecting image frames from the image frames of the object of interest at set intervals; generating, from the selected frames, selected frame latent vectors that are a compressed representation of the image frames of the object of interest; reconstructing by interpolation a number of in-between latent vectors between two successive selected frame latent vectors; decoding both the received selected frame latent vectors and reconstructed in-between latent vectors and generating frames; and generating image frames of the object of interest from the selected frame latent vectors and the in-between latent vectors, including image frames corresponding to image frames of the object of interest that were not selected in the selecting step.

The number of generated in-between latent vectors may be the same as the frames not selected, or the number of generated by interpolation in-between latent vectors may not be the same as the frames not selected.

In another aspect, a non-transitory computer-readable storage medium stores instructions that, when executed by one or more processors of a computer system, cause the computer system to perform operations comprising: receiving, image frames of an object of interest; selecting image frames from the image frames of the object of interest at set intervals; generating, from the selected frames, selected frame latent vectors; the selected frame latent vectors being a compressed representation of the image frames of the object of interest; reconstructing by interpolation a number of in-between latent vectors between two successive selected frame latent vectors; decoding both the received selected frame latent vectors and reconstructed in-between latent vectors and generating frames; and generating image frames of the object of interest from the selected frame latent vectors and the in-between latent vectors, including image frames corresponding to image frames of the object of interest that were not selected in the selecting operation.

The number of generated by interpolation in-between latent vectors may not be the same as the frames not selected.

What is further disclosed is a system that comprises a plurality of sending and receiving units which are employed to compress and transmit data between the plurality of sending and receiving units.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present invention will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

Figure 1:
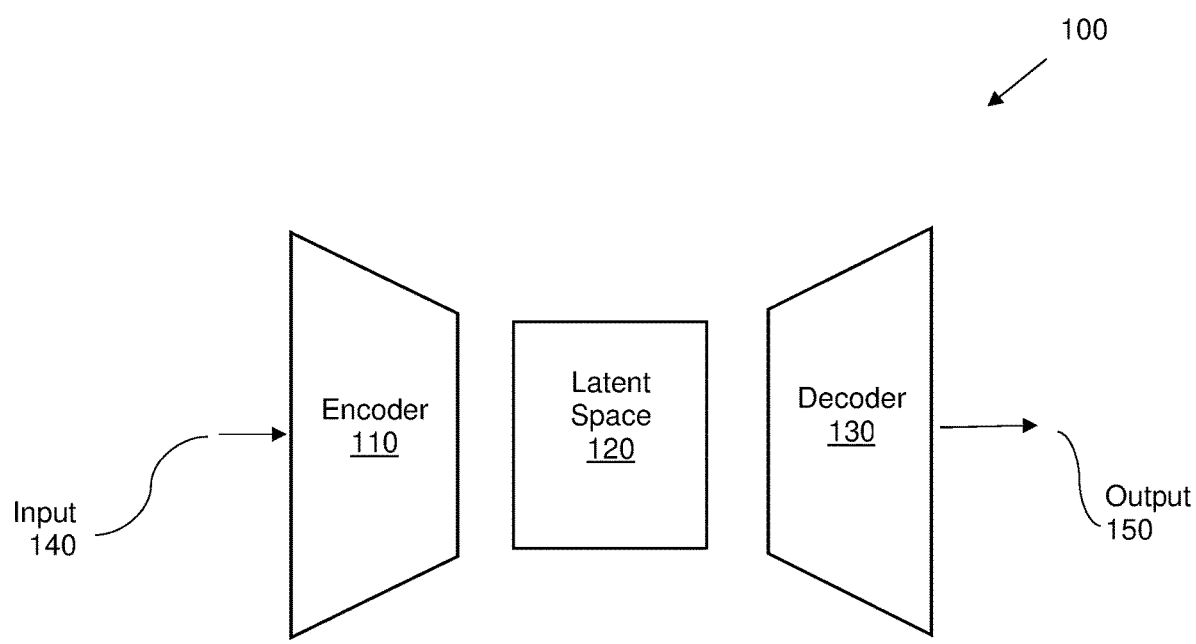
FIG. 1 is a block diagram of an encoder-decoder combination.

In the following description, reference is made to drawings which show by way of illustration various embodiments. Also, various embodiments will be described below by referring to several examples. It is to be understood that the embodiments may include changes in design and structure without departing from the scope of the claimed subject matter.

Described embodiments make use of interpolation between two images. Interpolation between two images takes place in latent or hidden space. Latent space can be described with the use of an encoder-decoder system. In some embodiments, both the encoder and decoder are comprised of neural networks. The encoder brings the data from a high dimensional input to a bottleneck layer, where the number of neurons is the smallest. The latent space is the space in which the data lies in the bottleneck layer. It is also sometimes said that the encoder transforms or maps the data to latent space. Then, the decoder takes this encoded input and converts it back to the original input shape. An autoencoder, for example, is composed of an encoder and a decoder.

In general, an autoencoder is trained to output whatever is inputted, acting as an identity function. The encoder therefore encodes all the input data into a compressed representation. It can be said that the encoder therefore encodes the input data from a higher dimensional input to a lower dimension or a compressed representation. There must be enough information in the compressed representation for the decoder to reconstruct the input data. To perform well, the network has to learn to extract the most relevant features. It is this compressed representation that is in the latent space. An object's representation in latent space is a latent representation. The latent representation of an object can be data points in latent space. The data points in latent space can be represented as vectors. These vectors in latent space are what is meant by latent vectors. In the latent space, similar data points will tend to cluster together.

Data points in latent space can be defined by the latent variables. Latent variables are variables which are not directly observable. Latent variables can be represented by latent vectors.

By way of example, to recognize handwritten digits, at the input of the network are images comprising a matrix of pixels of handwritten digits from 0 to 9 fed into the network. This matrix of pixels can be referred to as pixel space. At the output, the network indicates the digit of the image it received. Briefly, first the network is trained to recognize the handwritten digits. This is done by giving the network a lot of images of handwritten digits and telling the network whether it gets the answer right or wrong. If the network gets the answer wrong, the network adjusts the weights of the neurons in the network by back propagation. This is continued until the network is good enough to recognize the handwritten digits accurately to an acceptable level.

In an illustrative scenario, when the encoder receives an image of, e.g., a "1", in pixel space it encodes the image and transforms or maps the image to latent space. In latent space, the image has a latent representation which is a latent data point. The latent point can be described with latent variables. The latent point can be represented by a latent vector. During the learning process, the encoder allocates a data point in latent space for the image of the "1" received in pixel space. The encoder makes this allocation for all 10 images of the handwritten digits from 0 to 9. When the latent space is studied it is then found that the different digits cluster together, meaning that all handwritten 0s are given points in latent space that occupy a certain region in latent space. This is also true for all the other handwritten digits. This means that all the 1's, 2's, 3's and so on are grouped together in a certain region in latent space. Each handwritten digit, from zero to 9 is given a certain region in latent space For vector arithmetic and interpolation calculations, latent space has structure that can be used. Interpolation between points can be done as well as performing vector arithmetic between points in latent space. The results have meaningful and targeted effects on the generated images.

Vector Arithmetic

Vector arithmetic can be done with images. A typical example would be an image with a man with glasses, an image of a man without glasses and an image of a woman without glasses. The image of the man with glasses in pixel space is transformed by an encoder to latent space. The same is done with the image of the man without glasses, as it is also transformed from pixel space by an encoder to latent space. The latent space representations of the two images are subtracted from each other. As explained above the representations in latent space can be latent data points that can be represented as latent vectors. After the subtraction, what remains is a representation in latent space of the glasses. Now the image of the woman without glasses is transferred via an encoder to a latent representation in latent space. In latent space, the representation of the glasses is added to the latent representation of the woman without the glasses, resulting in a latent representation of the woman with glasses. This result is then transferred from latent space to pixel space with a decoder. The end result is an image of a woman with glasses in pixel space.

Interpolation

As discussed, a specific image has a specific latent representation being a specific point (or vector) in latent space. For example, provided two original images, where a first image of a person looks slightly to the right and a second image a person looking slightly to the left, each of these two images can be transformed into latent space with an encoder, each image having a specific point in latent space. A series of points can be created on a linear path between the two points in the latent space. These points can be represented as latent vectors. These are the in-between latent vectors. The result is an interpolation between the two points in latent space. These series of interpolated points can be fed to a decoder.

These points generate a series of images that show a transition between the two original images, resulting in a series of images that start with the first image of a person looking slightly to the right, a series of in-between images, and ends with the second image, a person looking slightly to the left. More specifically, in the series of in-between images, the first image next to the image of a person looking slightly to the right, the face starts turning slightly to the left. In each subsequent image the face turns more towards the left. Towards, the middle (halfway between the two original images) the face may be looking more or less straight forward. Finally, further on in the series of in-between images, the face may start facing towards the left.

In some embodiments, a decoder transforms or maps latent variables in latent space to observable variables. For example, a decoder takes the latent representation of latent variables of an image in latent space and transforms them to an image (observable variables) in pixel space.

In some embodiments, an encoder transforms or maps observable variables to a latent representation of latent variables in latent space. For example, an encoder takes the pixels of an image in pixel space (observable variables) and transforms them to a latent representation in latent space. This latent representation can be latent variables. The latent variables can be represented as latent data points in latent space. The latent data points can be represented as latent vectors.

Input of the encoder may be referred to as high dimensional input. It is also referred to as an ambient space or pixel space in the case of images. It can be said that the encoder takes the observable variables from a high dimensional input and maps it to a lower dimensional output in latent space as latent variables.

"Interpolation" is used herein to refer to a method of mathematical estimation of data points between two original images. In some embodiments, interpolation is employed by transforming each of the original images with an encoder to a specific point in latent space. A series of points can be created on a linear path between the two points in the latent space. These series of points can be fed to a decoder. These points generate a series of images that show a transition between the two original images, generating by interpolation images between the two original images.

A series of points can be created on a linear path between two points in latent space by interpolation. This series of points are interpolated points. This series of interpolated points can be represented by vectors, which may be referred to as interpolation vectors or interpolated vectors.

Some embodiments use a representation of compressed latent data in which similar data points are closer together in latent space. This representation can be referred to as latent representation. In some embodiments, an encoder brings the data from a high dimensional input (e.g., an object such as an image composed of pixels in pixel space) to a bottleneck layer of a neural network, where the number of neurons is the smallest. The latent space is the space in which the data lies in the bottleneck layer. It can be said the encoder therefore encodes the input data from a higher dimensional input to a lower dimension or a compressed representation. The latent representation of an object can be latent variables that represent latent data points. The data points in latent space can be represented as latent vectors.

In some embodiments, an encoder transforms data into latent space, transforming or mapping observable variables into latent variables. A latent representation of the data is a compressed representation of the data and appears in latent space. This latent representation can be latent variables, which can be represented as latent points in latent space. The latent points can be represented as latent vectors.

"Pixel space" as used herein contrasts with latent space. In some embodiments, an encoder transfers an object such as an image that is composed of pixels from pixel space to a latent representation in latent space. In some embodiments, the decoder (after mathematical manipulation such as interpolation) transfers the latent representation from latent space back into pixel space as observable variables in pixel space.

Described embodiments make use of artificial intelligence (AI) and machine learning, such as an AI training model including an encoder-decoder combination. Such an encoder-decoder combination is shown in FIG. 1. As can be seen the encoder-decoder combination 100 is comprised of an encoder 110 and decoder 130. The encoder 110 and decoder 130 can be composed of neural networks.

Between the encoder 110 and the decoder 130 is located a latent space 120. Encoder 110 receives input 140. Decoder 130 generates output 150. Encoder 110 and decoder 130 are trained jointly to generate at the output 150 high quality reconstructions of input data at the input 140. Suitable neural networks may comprise Generative Adversarial Networks (GAN), which can be used in the training of the encoder 110 and decoder 130, so that the decoder 130 generates a high quality output 150 corresponding as much as possible to input data at the input 140. The input data can be video data, or audio data or both. For the purposes of the rest of this discussion the focus will be on video data or images.

Once trained, the encoder 110 receives image data at input 140. The encoder 110 then generates a latent representation in latent space 120 from that image data. The decoder 130 receives the latent representation which are latent variables. The latent variables can be latent data points represented as latent vectors in latent space 120. The decoder 130 then generates a reconstruction of the latent representation at output 150. It can thus be said that encoder 110 and decoder 130 form a trained encoder-decoder pair.

Figure 2:
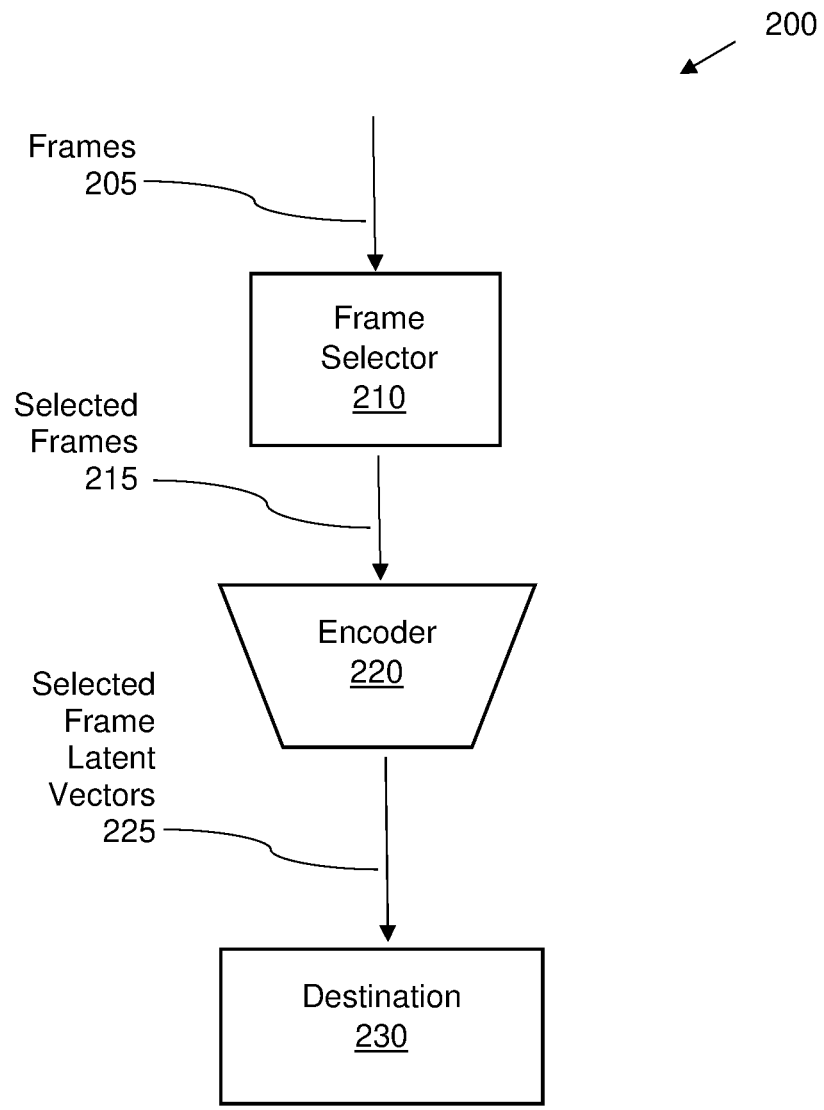
FIG. 2 is a flow diagram of a sending unit according to an embodiment.
Figure 3:
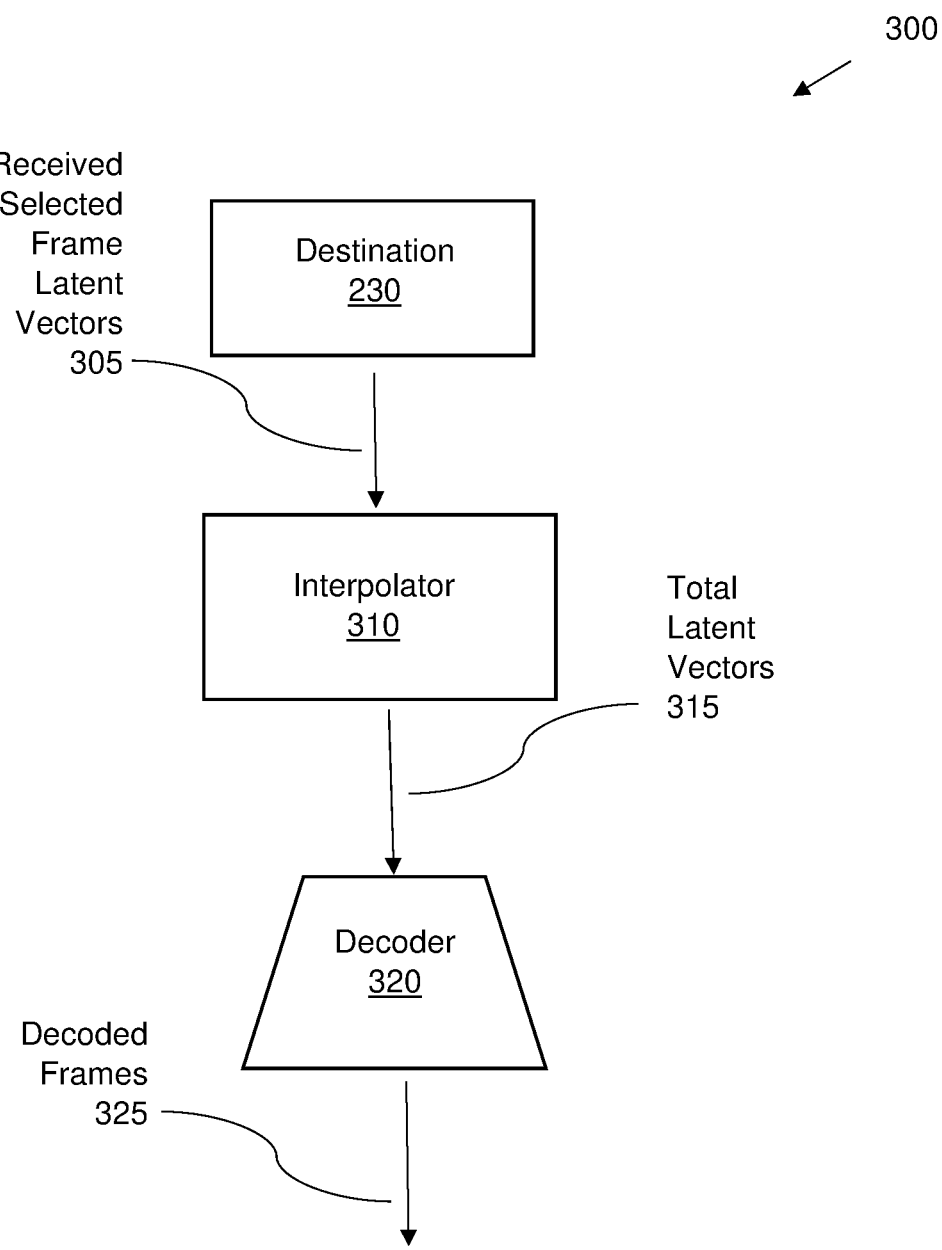
FIG. 3 is a flow diagram of a receiving unit according to an embodiment.

FIG. 2 is a flow diagram of a sending unit 200. FIG. 3 is a flow diagram of a receiving unit 300. Sending unit 200 has an encoder 220. Receiving unit 300 has a decoder 320. Encoder 220 and decoder 320 form a trained encoder-decoder pair as discussed previously with encoder 110 and decoder 130 above.

FIG. 2 shows sending unit 200 configured to send data to destination 230. This data can contain video as well as audio or it can contain only video or only audio. Sending unit 200 is comprised of a frame selector 210, and as mentioned encoder 220. The encoder 220 is connected to a destination 230. The sending unit 200 is capable of receiving frames 205 of an object of interest that enters the frame selector 210. As will be shown later, the object of interest can be the face, arms, body, or combinations thereof of a person, and the frames 205 can be images of the object of interest. The frame selector 210 creates selected frames 215 by selecting frames from frames 205 at set intervals. For example, if the frames 205 are video frames at a rate of 60 frames per second, and the frame selector 210 selects frames at a set interval of 10 frames per second, then this would result in selected frames 215 of 6 frames per second. This means that 9 in-between frames of frames 205 were not selected. The in-between frames or frames not selected by the frame selector 210 may remain on the sending unit 200 or be discarded or sent to some other location, whereas the selected frames 215 are sent to encoder 220. The encoder 220 then encodes the selected frames 250 and generates, from the selected frames 215, selected frame latent vectors 225 that are sent to a destination 230. The selected frame latent vectors 225 are latent vectors from the selected frames 215.

The bandwidth required to send selected frame latent vectors 225 at a rate of 6 per second to destination 230 is much less than would have been the case compared to sending the frames 205 which are video frames at the rate of 60 frames per second to destination 230, resulting in an optimized and efficient way of sending data through a network. Thus, the latent representation of the selected frame latent vectors 225 is a compressed representation of the frames 205 of the object of interest.

As will be shown later the destination 230 can be a receiving unit. A receiving unit can also be a receiving unit as used in video conferencing. The destination 230 can also be storage medium where video and audio recordings are stored or recorded to be played back at a later stage by using a receiving unit.

Shown in FIG. 3 is a flow diagram of a receiving unit. In FIG. 3, receiving unit 300 has an interpolator 310 and a decoder 320. The receiving unit 300 is configured to receive selected frame latent vectors 305. The received selected frame latent vectors 305 are sent to the interpolator 310. The latent vectors 305 are latent representations. The encoder 220 in FIG. 2 has transformed selected frames 215 to latent space. These latent representations, as discussed before, can be latent variables. These latent variables can be represented as latent data points in latent space. Two successive selected frames 215 can thus be transformed into two latent data points in latent space. Being in latent space, the interpolator 310 creates a series of points on a linear path between the two points in the latent space. This series of points are interpolated points. This series of interpolated points can be represented by interpolation vectors. It can thus be said that interpolator 310 reconstructs, by interpolation, a number of in-between latent vectors between two successive selected frame latent vectors 305. It is these in-between latent vectors between two successive selected frame latent vectors 305 that are known as interpolated vectors.

The total latent vectors 315 are the received selected frame latent vectors 305 and the reconstructed latent vectors by the interpolator 310. The total latent vectors 315 are sent to decoder 320.

The number of reconstructed in-between latent vectors can be the same as the frames not selected by frame selector 210 in sending unit 200. In the previous example where the series of frames 205 were at the rate of 60 frames per second and the frame selector 210 selected every 10$^{th}$ frame, resulting in selected frames 215 at the rate of 6 frames per second, 9 in-between frames are not selected by frame selector 210. The interpolator 310, to compensate for these 9 non-selected in-between frames, must therefore generate or reconstruct by interpolation 9 reconstructed in-between latent vectors between two consecutive received selected frame latent vectors 305. The decoder 320 then decodes both the received selected frame latent vectors 305 as well as the reconstructed in-between latent vectors by interpolation by interpolator 310. This will bring the frame rate back to the initial frame rate 60 frames per second of frames 205 at the output of the decoder 320, which are the decoded frames 325. It should be understood, however, that this invention is not limited in that the number of in-between latent vectors must be the same as the non-selected frames by frame selector 210. It could be decided that even though the initial series of frames 205 were at the rate of 60 frames per second, after reconstruction by the interpolator 310, the total latent vectors 315 are only at 30 vectors per second. This will result in decoded frames 325 at the output of decoder 320 at the rate of 30 frames per second. Similarly, even if the initial series of frames 205 were, for example, at the rate of 30 frames per second, it can be arranged that after reconstruction by the interpolator 310, the total latent vectors 315 are at 60 vectors per second. This will result in decoded frames 325 at the output of decoder 320 at the rate of 60 frames per second.

In the case where the frames 205 are video images and the object of interest moves around very dynamically, the number of selected frames 215 by the frame selector 210 would have to be relatively high in order to give a more accurate portrayal of the object of interest.

However, in some situations, such as videoconferencing (VC), where a great deal of footage is transmitted of a single object of interest under relatively consistent situations, the number of selected frames 215 by the frame selector 210 can be relatively lower in order to give a relative accurate portrayal of the object of interest. For example, if the selected frames 215 are at the rate of 6 frames per second, this gives a time spacing between the selected frames 215 a period of 166.7 milliseconds. Not much happens, that is noticeable, to an object of interest (e.g., the face of a person) in a video conversation during a period of on the 166.7 milliseconds.

Figure 4:
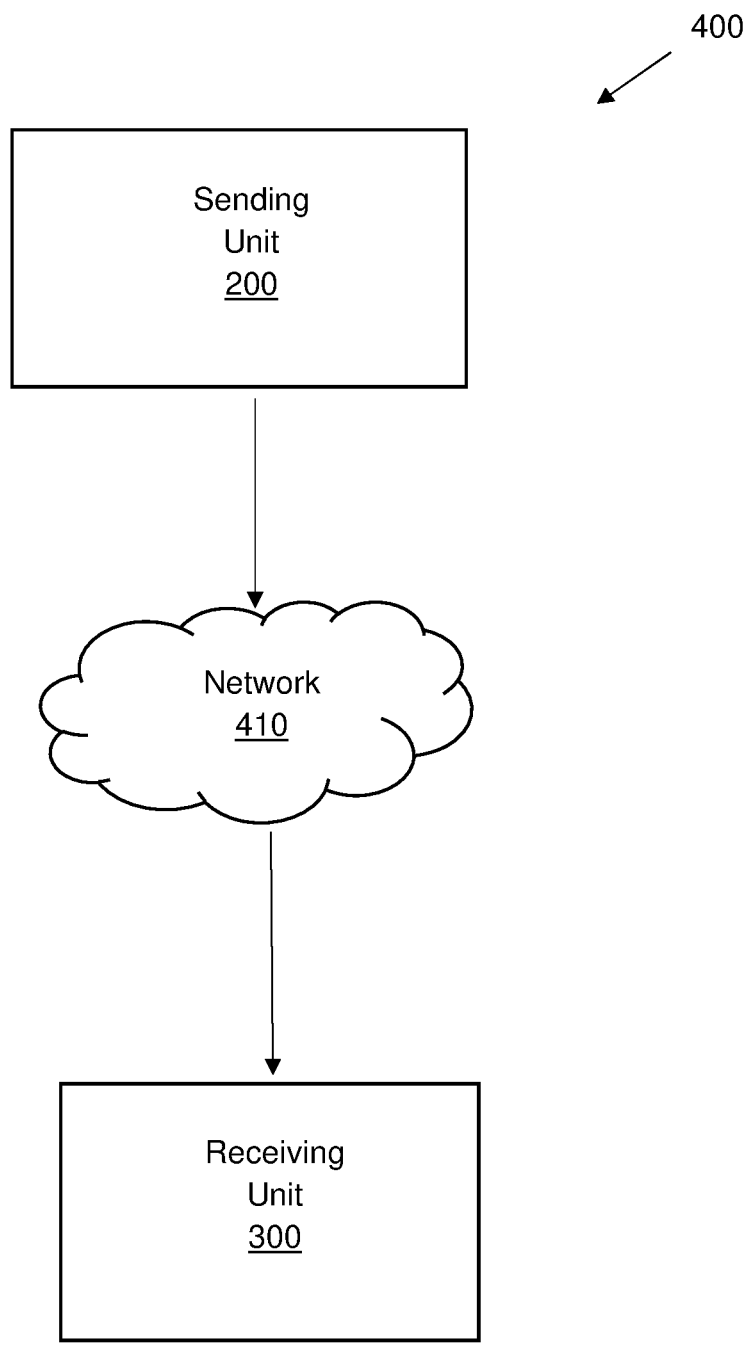
FIG. 4 is a flow diagram of a system comprising a sending unit and a receiving unit according to an embodiment.

FIG. 4 is a diagram of an embodiment of a system 400 for transmitting and receiving data. The data comprises video or audio or video and audio data. System 400 has a sending unit 200 connected to a receiving unit 300 via network 410. A network 410 can be for example the internet or a local area network (LAN). It also includes anything that connects the sending and receiving unit (200, 300) through cables, telephone lines, radio waves, satellites, or infrared light beams or any other means. This embodiment can be used for video conferencing.

Figure 5:
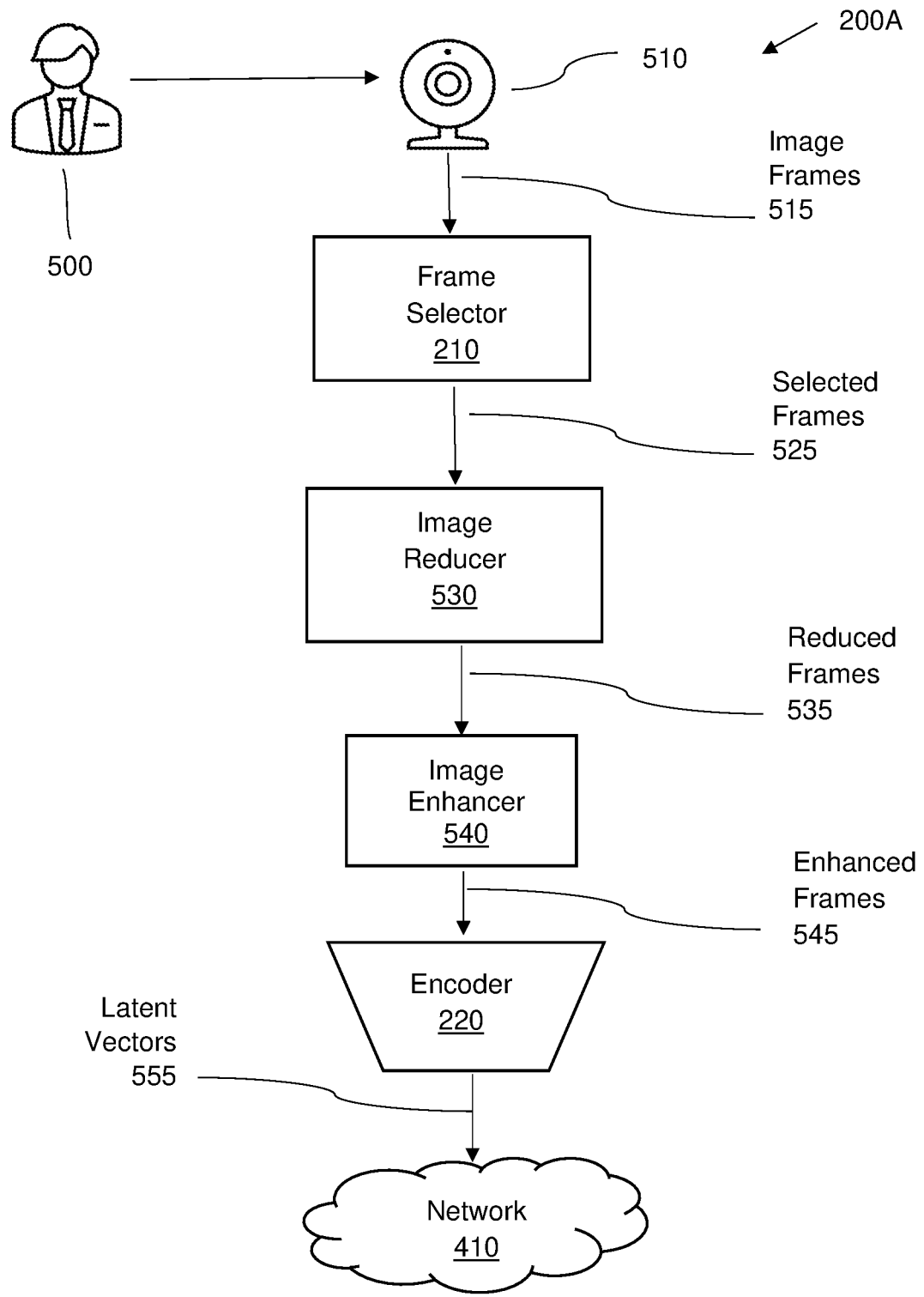
FIG. 5 is a flow diagram of another embodiment of the sending unit.
Figure 6:
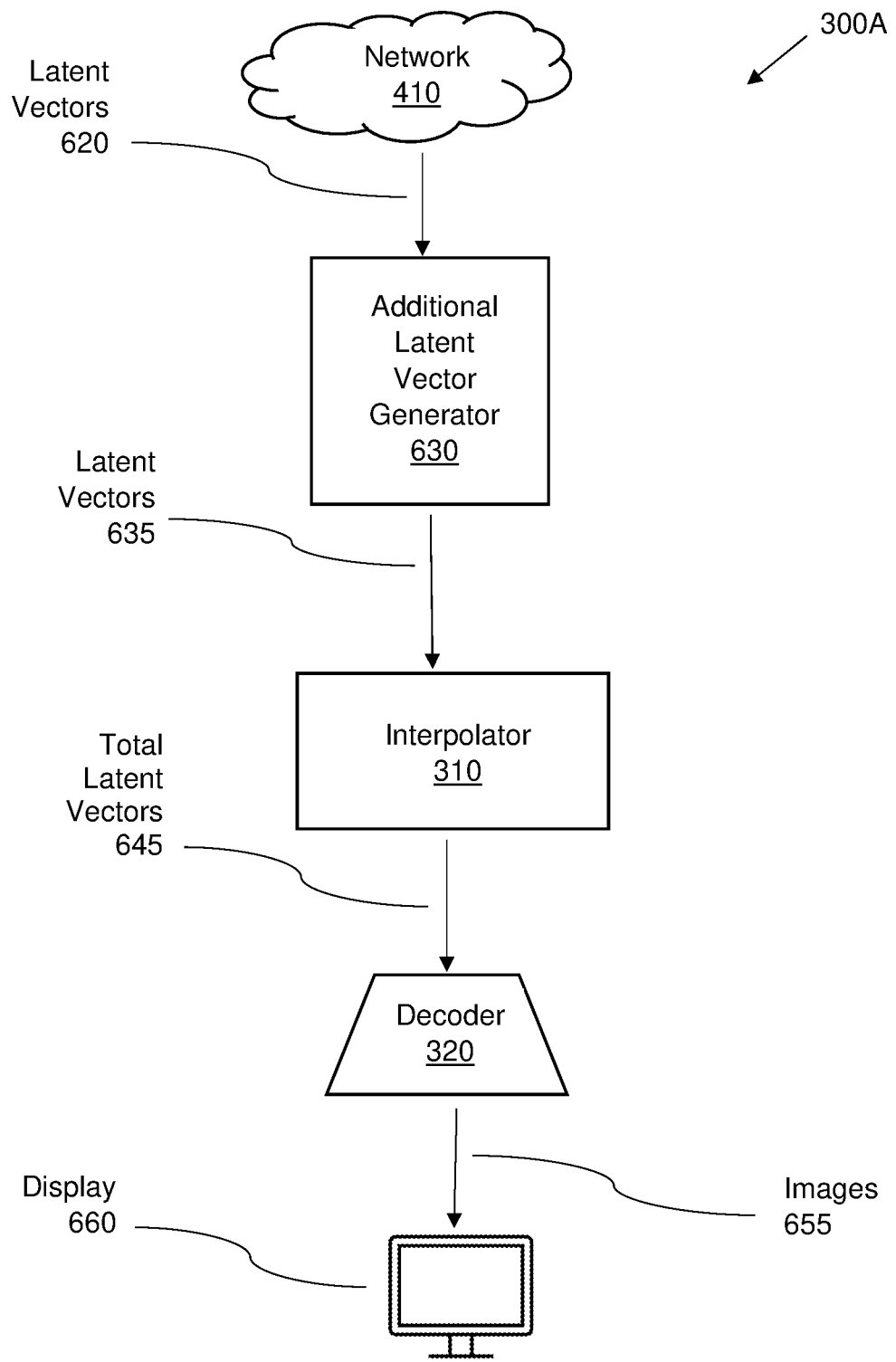
FIG. 6 is a flow diagram of another embodiment of the receiving unit.

FIG. 5 is a flow diagram of another embodiment of a sending unit 200A including the encoder 220. FIG. 6 is a flow diagram of another embodiment of a receiving unit 300A including the decoder 320. Encoder 220 and decoder 320 form a trained encoder-decoder combination as discussed above. The encoder 220 and the decoder 320, which can each respectively be a neural network in the encoder-decoder combination, are trained jointly to generate high quality reconstructions of input images.

The encoder 220 and decoder 320 are initially trained by feeding the encoder 220 a large number (e.g., 1000s) of images (e.g., images of faces). During training the weights of the encoder 220 and decoder 320 are updated by means of backpropagation. Training is continued until the decoder 320 successfully reconstructs the original face at the input of the encoder 220.

Referring to FIG. 5, sending unit 200A has some resemblance with sending unit 200 in FIG. 2 in that it also has frame selector 210 and encoder 220. Furthermore, sending unit 200A in FIG. 5 comprises capturing device 510 that is used to capture images of an object of interest 500. Capturing device 510 can be a standalone camera or a camera mounted in a desktop, laptop, tablet, smart phone or any other similar electronic device. An object of interest 500 can be the face of a person, or any other object included in a frame, such as a person's body, torso, arms, hands, and the like. The capturing device 510 generates image frames 515 at a set frame rate of, for example, 60 frames per second of the object of interest 500.

The capturing device 510 is connected to a subcomponent, the frame selector 210. The frame selector 210 selects an image frame from frames 515 at a set interval. For example, the frame selector 210 may select every tenth image frame from the image frames 515. At a frame rate of 60 frames per second, as generated by the capturing device 510 and frame selector 210 selecting each tenth frame, the resulting selected frames 525 are at a frame rate of 6 image frames per second. Once again, the frames not selected by the frame selector 210 may remain on the sending unit 200A or be discarded or sent to some other destination.

In an embodiment, the selected frames 525 are sent by the frame selector 210 to an image reducer 530. There are several ways in which reduction in image size can be achieved by the image reducer 530 subcomponent.

Firstly, in an embodiment, the reduction in image size can be done by removing the background. Where the object of interest 500 is the face and body in the image frames 515, the background is removed so that only the face and body remain in the reduced frames 535.

Secondly, in a further embodiment, the reduction in image size can be achieved by separating the object of interest 500 and background in each selected frame 525, and then performing different kinds of compression, e.g., by performing higher resolution compression on the object of interest 500 in each selected frame 525 and performing lower resolution compression on the background in each selected frame 525. In this manner a reduction in image size of selected frames 525 can be achieved by the image reducer 530 resulting in reduced frames 535 at a reduced size while allocating higher resolution to the object of interest and allocating lower resolution to the background, where compression artifacts will be less noticeable.

In another embodiment, provision is made for another subcomponent, an image enhancer 540. The image reducer 530 is connected to the image enhancer 540. The image reducer 530 thus sends the reduced size reduced frames 535 to image enhancer 540. The image enhancer 540 enhances the image of the object of interest 500 in reduced frames 535. The enhancement of the image of the object of interest 500 is done by upscaling the object of interest 500 in size in the sending unit 200A. The object of interest 500 is later downscaled in size in the receiving unit 300A. Firstly, a fast detection algorithm is used to detect if an object of interest 500 is present the reduced frames 535. If an object of interest 500 is present in the reduced frames 535, then a transform is performed by scaling up or magnifying the object of interest 500. In this manner more information is contained in the object of interest 500, increasing the quality of the image of the object of interest and its resolution. The magnified or scaled up object of interest is sent through the network 410 to the receiving unit 300A shown in FIG. 6. In one example, the object of interest is a portion of an overall target. For example, if the target is a person whose image is being captured by a camera for transmission to a receiving unit during a video-conference, the object of interest may be the face of the person. Thus, the image enhancer 540 selects the face of the person and then upscales it, while leaving the body (e.g., the torso and the hands) without modification. The receiving unit 300A receives the magnified or scaled up image of the object of interest 500, the remaining parts that are not the object of interest 500 (i.e., the body and the arms), and object of interest's 500 position. The receiving unit 300A applies an inverse transform and gets the object of interest 500 back to its original proportions before processing it further. The object of interest 500 may then be viewed in its original proportions but at a higher resolution at the receiving unit 300A. The image enhancer 540 is connected to a subcomponent an encoder 220.

As discussed before, the encoder 220 takes the enhanced frames 545 and brings the enhanced frames 545 from a high dimensional input to a bottleneck layer, where the number of neurons is the smallest. This bottleneck layer is the latent space. The encoder 220 transforms the image frames 545 from pixel space to latent space. The latent space comprises a compressed latent representation of the enhanced frames 545. The encoder 220 takes the image frames 545 and turns the image frames 545 into a latent representation in latent space. The latent representation is a number of latent variables. The latent variables can be represented as latent points in latent space. The latent points can be represented as latent vectors 555. It is these latent vectors 555 that can be used to perform linear interpolation in latent space.

As can be seen in FIG. 4, sending unit 200 is connected by network 410 to receiving unit 300. Similarly, and as discussed before, latent vectors 555 shown in FIG. 5 are thus transmitted via the network 410 to the receiving unit 300A, as shown in FIG. 6. In this manner, instead of transmitting all 60 image frames 515 per second, what is transmitted are the latent vectors 555 at a rate of 6 latent vectors 555 per second. The latent vectors 555 are thus a compressed representation of image frames 515. The latent vectors 555 at a rate of 6 frames per second require a much smaller bandwidth than would be the case if all 60 image frames 515 per second were transmitted via the network 410. This approach reduces the required transmission bandwidth, as the latent vectors 555 are being transmitted at a reduced bandwidth. The image frames not selected by frame selector 210, i.e., the non-selected in-between image frames between the selected image frames 525, are not transmitted and thus remain on sending unit 200A. Thus, an efficient transmission of data while providing an enhanced quality of the image of the object of interest is achieved through embodiments of the current disclosure, which can increase the quality of experience of users in videoconferences while reducing hardware requirements or preventing network congestions.

Example applications of embodiments of the current disclosure that can benefit from the benefits herein described can include videoconferences for remotely meeting, learning, shopping, playing and working requiring certain levels of remote collaboration and user interactions. One particular application of such videoconferences can be those taking place in 3D virtual environments, where a virtual cutout of a user can be inserted into the virtual environment close to real-time. Because of an efficient transmission of data and enhanced quality of image without extra requirements of hardware, participants of videoconferences in 3D virtual environments can enjoy a smooth experience where their image is efficiently transmitted into the virtual environment and viewed accordingly by other users.

In FIG. 5, a particular arrangement is shown that follows the sequence of subcomponents of frame selector 210, image reducer 530, image enhancer 540 and encoder 220. It should be understood that this invention is not limited to this particular sequence of subcomponents. The sequence of subcomponents of image reducer 530, image enhancer 540 frame selector 210 and encoder 220 also falls within the scope of this invention. Any workable sequence of subcomponents falls within the scope of this invention.

As mentioned, FIG. 6 is a flow diagram of another embodiment of a receiving unit 300A. Latent vectors 555 are transmitted via the network 410 to the receiving unit 300A and arrive as latent vectors 620, as shown in FIG. 6. Receiving unit 300A resembles receiving unit 300 in FIG. 3 in that it also has interpolator 310 and decoder 320. As mentioned, latent vectors 555 sent as the output of the encoder 220 via network 410 enter the receiving unit 300A as latent vectors 620.

Latent vectors 620 are sent to the additional latent vector generator 630. In this example, the additional latent vector generator 630 simply passes the received latent vectors 620 to its output, forwarding them as latent vectors 635 to interpolator 310. When, however, one or more latent vectors 555 in FIG. 5 are corrupted or dropped, for example due to network congestion, and thus are not received by the receiving unit 300A, the additional latent vector generator 630 can generate additional replacement latent vectors to replace the damaged or missing latent vectors 555. The additional latent vector generator 630 ensures that latent vectors 635 appear at its output at the required intervals as was transmitted by the sending unit 200A, for example, at the rate of 6 latent vectors per second.

Latent vectors 635 enter the interpolator 310. This can be received latent vectors 620 or received latent vectors 620 plus additional replacement latent vectors generated by additional later vector generator 630, which give rise to latent vectors 635. As discussed in FIG. 3, in the latent space, it is possible to generate by interpolation in-between latent vectors (interpolated vectors) between two successive latent vectors. Two successive latent vectors are thus selected by interpolator 310 and by interpolation in-between latent vectors between two successive latent vectors. Referring to FIG. 5, the generated-by-interpolation in-between latent vectors therefore compensate for the non-selected image frames that were not selected by frame selector 210, not encoded by encoder 220, not transmitted by sending unit 200A, and not received by receiving unit 300A.

As mentioned, the generated-by-interpolation in-between latent vectors will make up for the non-selected image frames by frame selector 210 and non-transmitted latent vectors. This means that the number of generated by interpolation in-between latent vectors will be the same as the non-selected image frames. This is so that it is possible to reconstruct images at a frame rate of the series of image frames 515 generated by the capturing device 510 in FIG. 5. However, as mentioned before, this need not always be the case. It can be decided to generate more interpolation vectors. For example, it can be that the capturing device 510 generated image frames 515 at the rate of 30 frames a second. Referring to FIG. 6, however, after the number of generated by interpolation of in-between latent vectors by interpolator 310 have been completed, the total latent vectors 645 may be at the rate of 60 latent vectors per second. It can also be decided to generate fewer interpolation vectors. For example, referring to FIG. 5, it can be that the capturing device 510 generated image frames 515 at the rate of 60 frames a second. However, referring to FIG. 6, after the number of generated by interpolation of in-between latent vectors by interpolator 310 has finished it may be that the total latent vectors 645 are at the rate of 30 latent vectors per second.

At the output of the interpolator 310 that is sent to the decoder 320 the following total latent vectors 645 appear:
1. Latent vectors 635, plus
2. Reconstructed by interpolation in-between latent vectors between latent vectors 635.

The decoder 320 decodes the total latent vectors 645 and generates images 655. The decoder 320 takes latent vectors 645 from latent space back to pixel space by generating images 655. The images 655 are then displayed on display 660.

So, in some embodiments, the system and a corresponding method of sending and receiving data of the current disclosure is implemented in practice as follows:
1. Firstly, an encoder is trained to encode faces by generating a latent representation such as a latent vector. What this means is that the encoder transfers the image of the faces in pixel space to latent space.
2. Secondly, a decoder is trained to decode the latent representation such as a latent vector. This means that the decoder transfers the image of a face from latent space back to pixel space.
3. The encoder is then installed on the sending unit, for example, by downloading it from the Internet.
4. The decoder is then installed on the receiving unit also, for example, by downloading it from the Internet.

Figure 7:
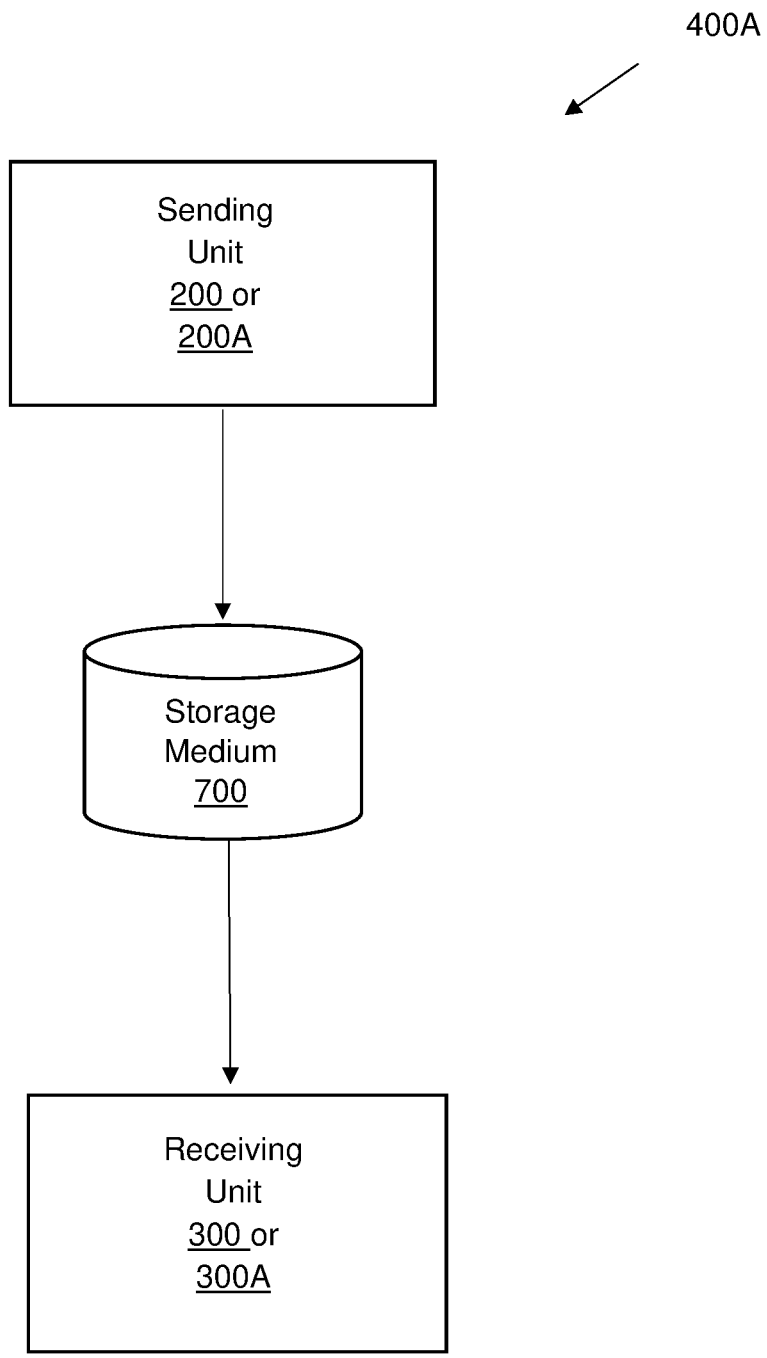
FIG. 7 is a flow diagram of a system comprising a sending unit and a receiving unit according to an embodiment.

It may be useful to also store the output of the sending unit to, for example, enable a video conference to be recorded so that it is possible to retrieve the recording later on. When the frame selection and encoding is being used to reduce the storage size of the images, the images are stored locally by the set of one or more computers on a storage medium. Once stored, the images can be retrieved by a receiving unit. Such a system for the storing and retrieving of data is shown in FIG. 7 as system 400A. System 400A is similar to system 400 in FIG. 4, but the network 410 in FIG. 4 is replaced with a storage medium 700 in FIG. 7 of system 400A. In these implementations shown in FIG. 7, the system 400A has a sending unit 200 (FIG. 2) or 200A (FIG. 5) which stores or records frame latent vectors 225 (FIG. 2) or 555 (FIG. 5) on a storage medium 700.

Once stored, the recording on storage medium 700 can be accessed by a receiving unit, e.g., receiving unit 300 (FIG. 3) or 300A (FIG. 6). Storage medium 700 can be a hard disk on or for a computer, digital versatile disc (DVD), magnetic tape or a memory stick or anything else on which digital information can be stored or recorded and retrieved again.

Figure 8:
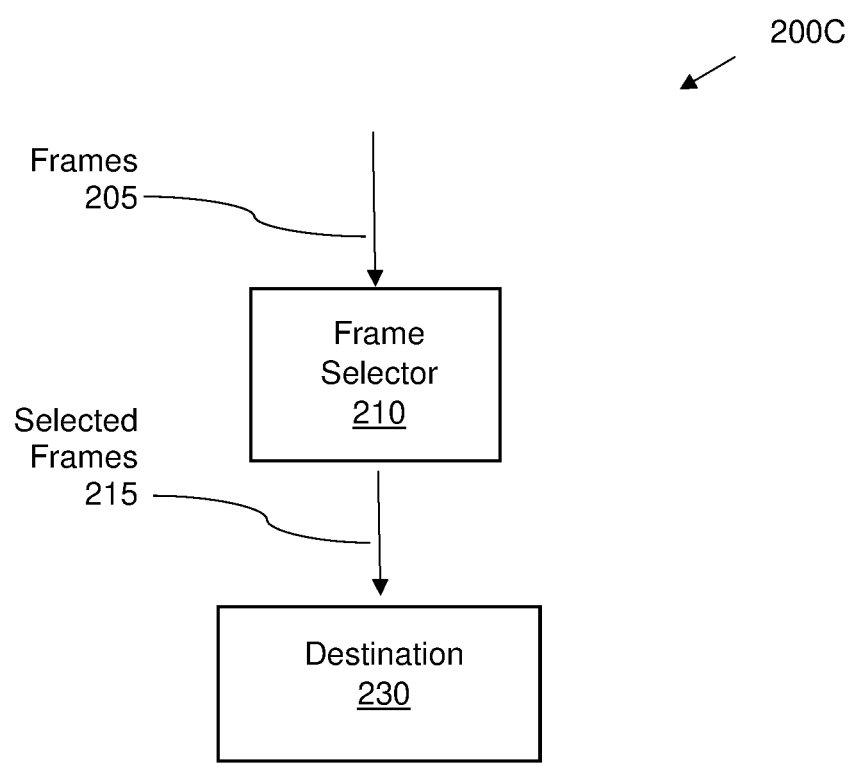
FIG. 8 is a flow diagram of another embodiment of a sending unit.

A flow diagram of another embodiment of a sending unit is shown in FIG. 8. In FIG. 8, sending unit 200C has some resemblance to the sending unit 200 in FIG. 2, but the sending unit 200C in FIG. 8 has no encoder 220 as in FIG. 2. What gets transmitted here in FIG. 8 to destination 230 are not the selected frame latent vectors 225 but selected frames 215. The frames not selected by the frame selector 210 may remain on the sending unit 200C.

In an illustrative scenario using the arrangement of FIG. 8, as mentioned in the example with the discussion of FIG. 2, the frames 205 are at the rate of 60 per second. Frame selector 210 once again selects frames at the rate of 10 per second. The selected frames 215 are at a rate of 6 per second. Instead of transmitting all 60 frames 205 per second, what is sent to destination 230 are selected frames 215 at a rate of 6 per second. The selected frames 215 at a rate of 6 per second, instead of frames 205 at a rate of 60 frames per second, transmitted to destination 230 reduce the required transmission bandwidth. The selected frames 215 at a rate of 6 per second are thus a compressed representation of frames 205 at a rate of 60 per second. The selected frames 215 are being transmitted at a reduced bandwidth if compared with what would have been the position if frames 205 at a rate of 60 frames per second were to be transmitted.

Figure 9:
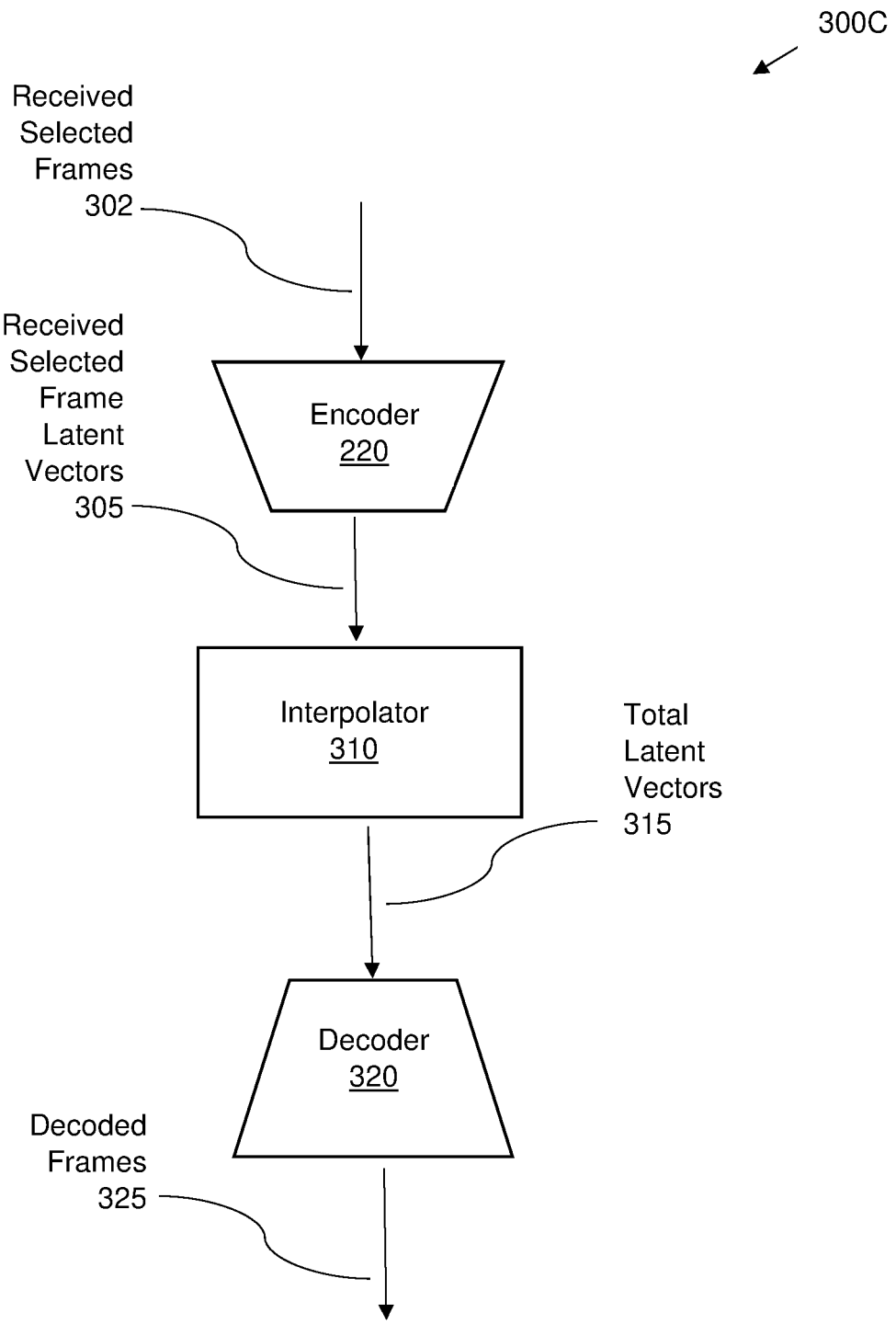
FIG. 9 is a flow diagram of another embodiment of a receiving unit.

FIG. 9 is a flow diagram of another embodiment of a receiving unit 300C. The receiving unit 300C may be used with the sending unit 200C shown in FIG. 8. This receiving unit 300C has some resemblance with receiving unit 300 shown in FIG. 3 in that receiving unit 300C also has an interpolator 310 and decoder 320. In FIG. 3 receiving unit 300 receives selected frame latent vectors 305. In FIG. 9, receiving unit 300C however receives selected frames 302, which may correspond to selected frames 215 in FIG. 8. The encoder 220 is in this arrangement part of the receiving unit 300C in FIG. 9. Received selected frames 302 in FIG. 9 are sent to encoder 220. Therefore, in this particular embodiment, the generation of received selected frame latent vectors 305 is done by encoder 220 and is located on the receiving unit 300C. The rest of the process in FIG. 9 progresses similarly to interpolator 310 and decoder 320 as discussed in FIG. 3. Decoder 320 decodes total latent vectors 315 into decoded frames 325.

The number of generated by interpolation in-between latent vectors by interpolator 310 in FIG. 9 can be the same as the not selected frames by frame selector 210 in sending unit 200C in FIG. 8. In the example in FIG. 2, the series of frames 205 were at the rate of 60 frames per second and the frame selector 210 chose every tenth frame. This will give a series of selected frames 215 of 6 frames per second. The same principle applies here in FIG. 8. If in FIG. 8 with sending unit 200C we start off with frames 205 at the rate of 60 frames per second, with frame selector 210 selecting at a rate of 10 per second, we end up with a series of selected frames 215 of 6 per second in FIG. 8. The selected frames 215 at a rate of 6 per second are received by receiving unit 300C shown in FIG. 9 as received selected frames 302 also at rate of 6 per second. The received series of selected frames 302 at rate of 6 per second goes to encoder 220. Encoder 220 encodes them, and outputs received selected frame latent vectors 305 at the rate of 6 latent vectors per second. In this example, encoder 220 is located on receiving unit 300C, meaning that 9 in-between frames are not selected. The interpolator 310 in FIG. 9 to compensate for these 9 non selected in-between frames must therefore generate or reconstruct by interpolation 9 reconstructed in-between latent vectors between two consecutive received selected frame latent vectors 305. This will bring the frame rate back to the initial frame rate 60 frames per second of frames 205 in sending unit 200C shown in FIG. 8. It should be understood once again however that this invention is not limited to this arrangement. This invention is not limited that the number of in-between latent vectors must be the same as the non-selected frames by frame selector 210 in FIG. 8. It could be decided that even though the initial frames 205 were at the rate of 60 frames per second, after reconstruction by the interpolator 310, the total latent vectors 315 are only at 30 vectors per second. Similarly, even if the initial frames 205 were for example at the rate of 30 frames per second, it can be arranged that after reconstruction by the interpolator 310, the total latent vectors 315 are at a rate of 60 latent vectors per second. Decoder 320 decodes total latent vectors 315 at a rate of 60 latent vectors per second into decoded frames 325 at a rate of 60 frames per second.

Figure 10:
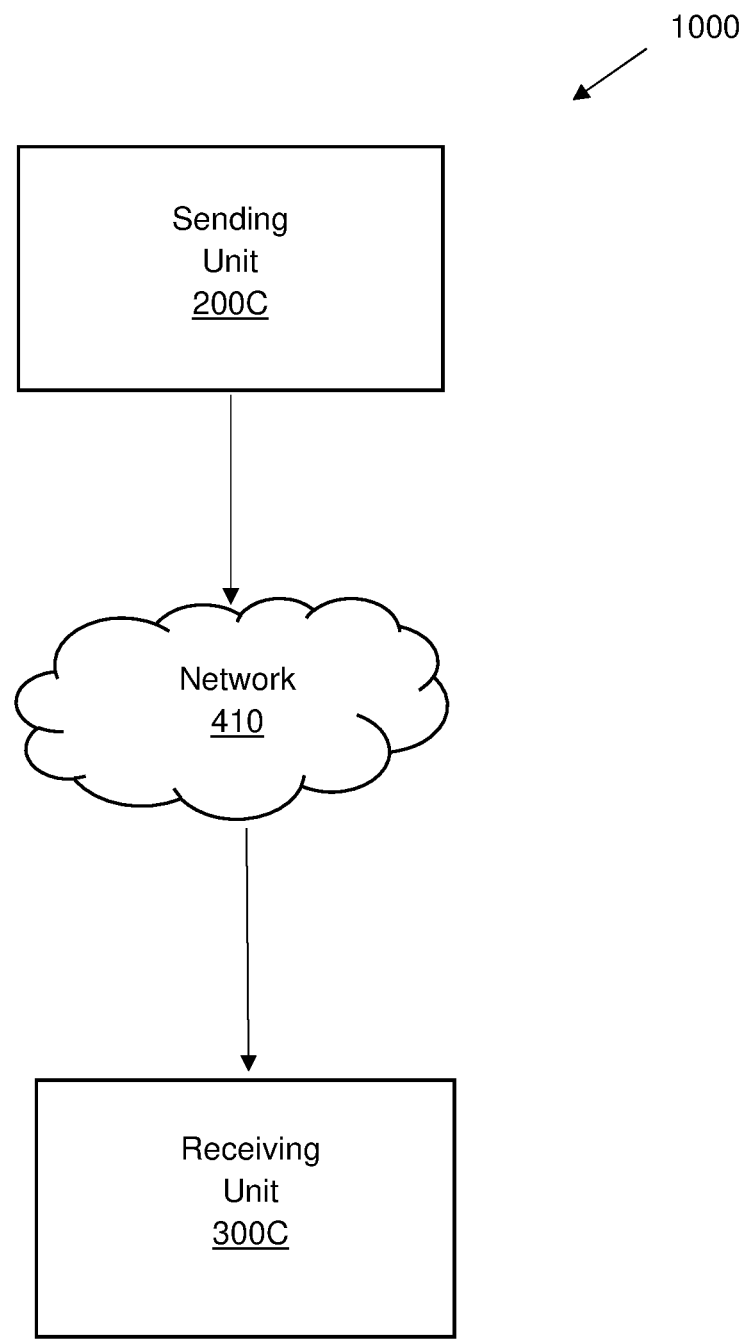
FIG. 10 is a flow diagram of another embodiment of a system comprising a sending unit and a receiving unit.

FIG. 10 is a flow diagram of another embodiment for a system 1000 for transmitting and receiving data. It is similar to what is shown in FIG. 4. System 1000 has a sending unit 200C connected to a receiving unit 300C via network 410. As mentioned before network 410 can be for example the internet or a local area network (LAN). It also includes anything that connects the sending and receiving unit (200C, 300C) through cables, telephone lines, radio waves, satellites, or infrared light beams or any other means. This embodiment can be used for video conferencing.

Figure 11:
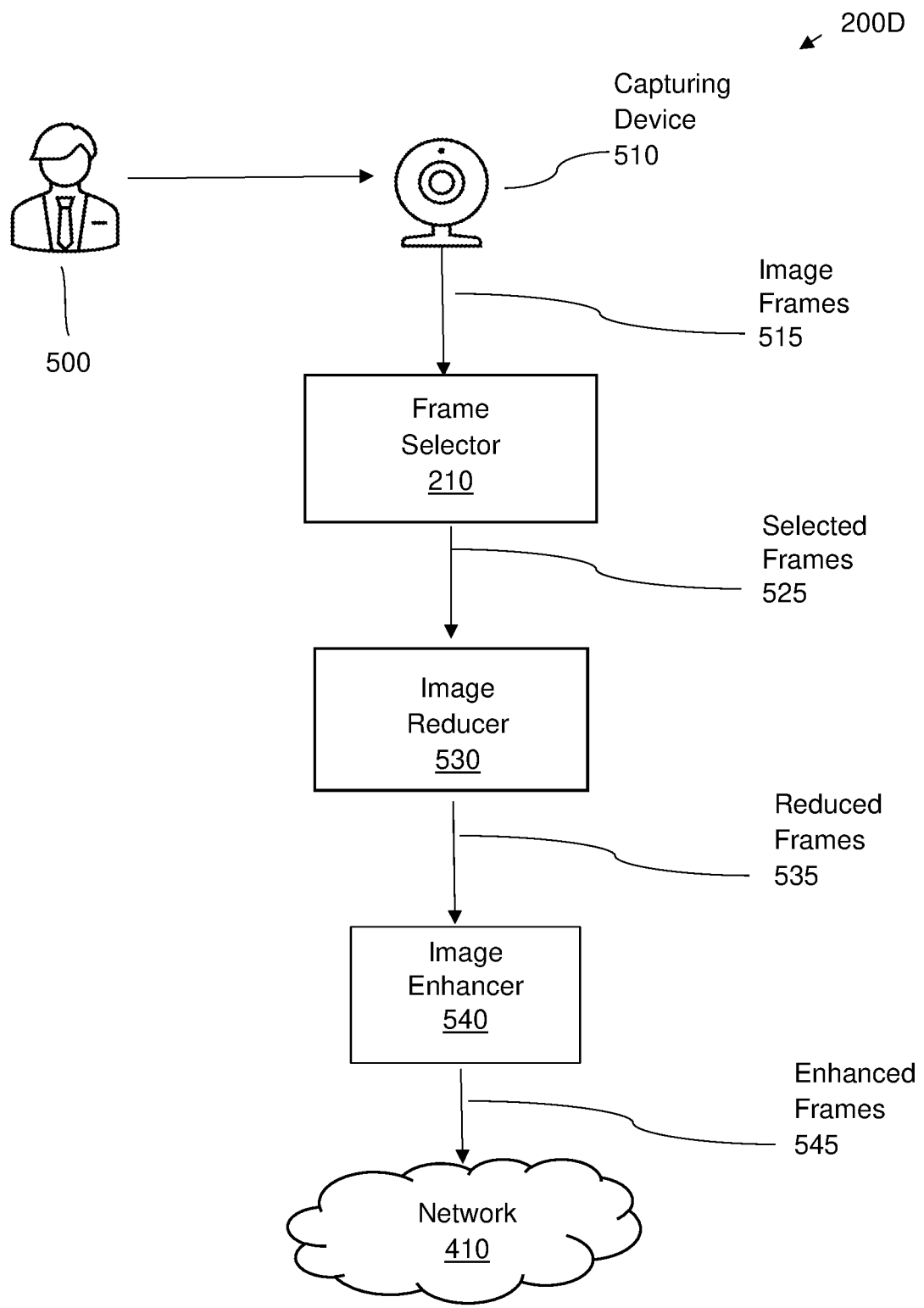
FIG. 11 is a flow diagram of another embodiment of a sending unit.

FIG. 11 is a flow diagram of another embodiment of a sending unit. Sending unit 200D has some resemblance with sending unit 200C in FIG. 8 in that it also has frame selector 210. Sending unit 200D also resembles sending unit 200A in FIG. 5. However, sending unit 200D in FIG. 11 does not have an encoder 220 when compared with sending unit 200A in FIG. 5. What is sent over the network 410 as shown in FIG. 11 are enhanced frames 545. These enhanced frames 545 are selected frames 525 that were processed by image reducer 530 an image enhancer 540. What is not sent over the network 410 are latent vectors 555 as shown in FIG. 5. As will be shown more clearly later in FIG. 12 encoder 220 is now located in receiving unit 300D.

In FIG. 11 frame selector 210, image reducer 530, and image enhancer 540 function and produce similar outputs as discussed before. As discussed before enhanced frames 545 are a compressed representation of image frames 515 produced by capturing device 510. Once again it should be understood that this invention is not limited to this particular sequence of subcomponents as shown in FIG. 11. Any workable sequence of subcomponents falls within the scope of this invention.

Figure 12:
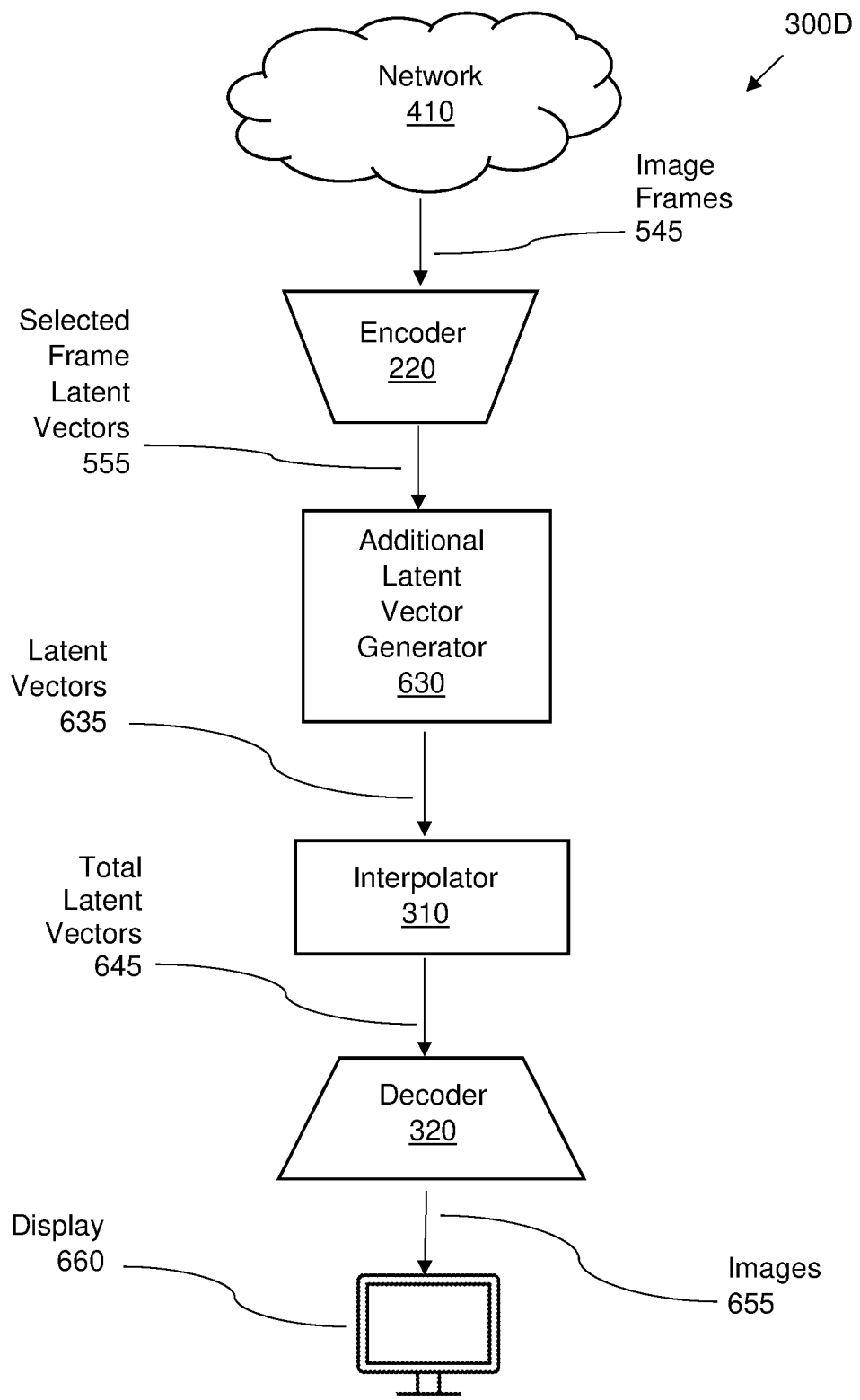
FIG. 12 is a flow diagram of another embodiment of a receiving unit.

FIG. 12 is a flow diagram of another embodiment of a receiving unit. Receiving unit 300D can be used with sending unit 200C in FIG. 8 and sending unit 200D in FIG. 11. Receiving unit 300D resembles receiving unit 300C in FIG. 9 as it also has an encoder 220, an interpolator 310, and a decoder 320. Receiving unit 300D also resembles receiving unit 300A in FIG. 6. However, when compared with receiving unit 300A in FIG. 6 the receiving unit 300D in FIG. 12 also has an encoder 220 before additional latent vector generator 630. The receiving unit 300D is capable of receiving enhanced frames 545 after it has been processed by the image reducer 530 and image enhancer 540. So just as before in FIG. 12 the encoder 220 generates from the image frames 545 selected frame latent vectors 555.

Selected frame latent vectors 555 are sent to the additional latent vector generator 630. As discussed before, the additional latent vector generator 630 simply passes the received latent vectors 620 to its output, forwarding them as latent vectors 635 to interpolator 310. In this case if one or more image frames 545 are corrupted or lost, for example due to network congestion, and thus are either not received by the encoder 220, or encoder 220 for some other reason unable to generate from the image frames 545, selected frame latent vectors 555 it then results in that no selected frame latent vector 555 is sent to the additional latent vector generator 630. In such a case additional latent vector generator 630 upon not receiving selected frame latent vector 555 can generate additional replacement selected frame latent vectors to replace the damaged or lost selected frame latent vectors 555. The additional latent vector generator 630 sees to it that latent vectors 635 appears at its output and input of interpolator 310 at the required intervals as was transmitted by the sending unit 200A. For example, in our case at the rate of 6 latent vectors per second.

Interpolator 310 in FIG. 12 reconstructs by interpolation a number of in-between latent vectors between two successive latent vectors 635. The number of generated-by-interpolation in-between latent vectors may be the same as the not selected frames by frame selector 210 in sending unit 200D in FIG. 11. This is as discussed previously to make up for the not-selected image frames that were not sent by sending unit 200D.

As discussed, before it can also be that the number of generated by interpolation in-between latent vectors by interpolator 310 in FIG. 12 is not the same as the not-selected image frames by frame selector 210 in FIG. 11.

As shown in FIG. 12 the interpolator 310 sends the total latent vectors 645 to decoder 320. The total latent vectors 645 are:

1. Selected frame latent vectors 555 generated by encoder 220 from image frames 545; plus
2. any replacement vectors generated by additional light and vector generator 630; plus
3. generated by interpolation in-between latent vectors by interpolator 310.

The decoder 320 receives and decodes total latent vectors 645 and generates frames as images 655. Images 655 are then displayed on display 660.

Figure 13:
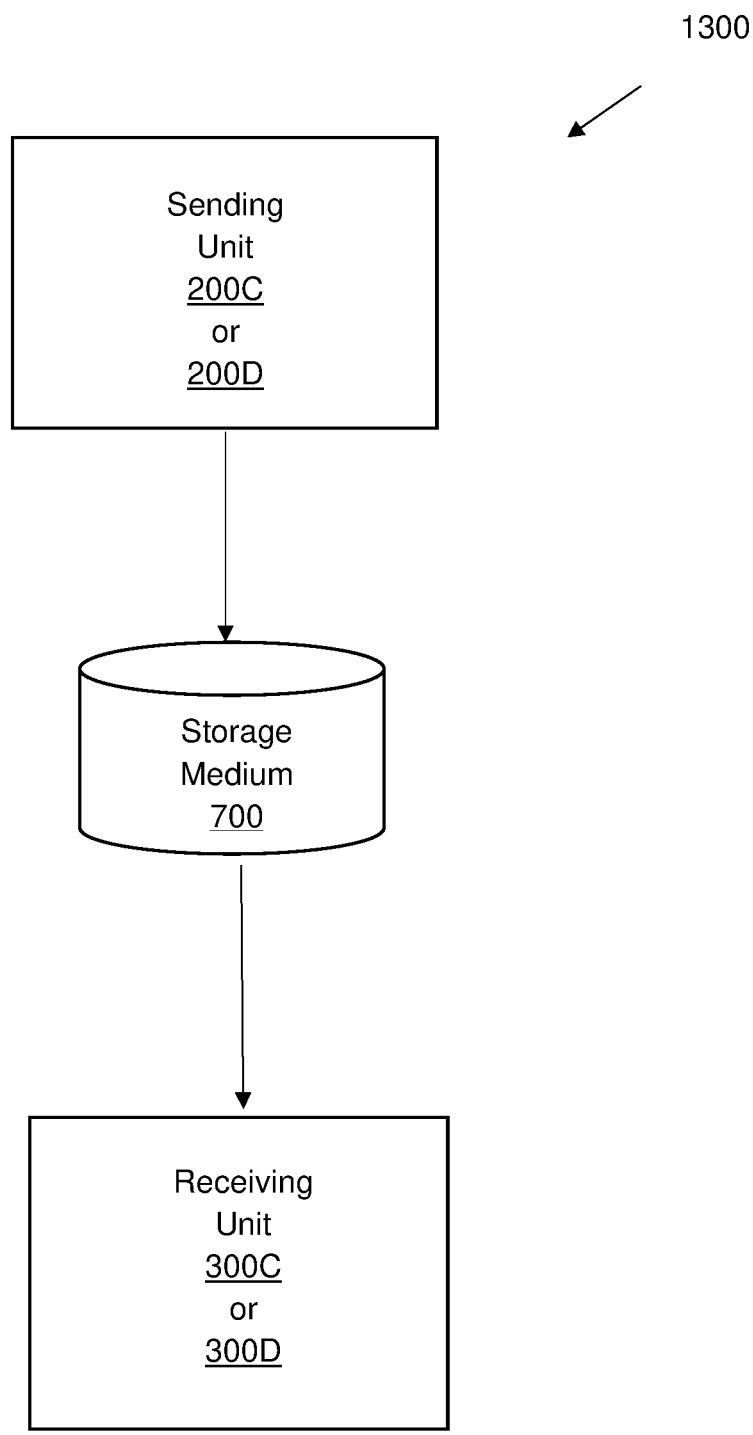
FIG. 13 is a flow diagram of another embodiment of a system comprising a sending unit and a receiving unit.

FIG. 13 is a flow diagram of a system for the storing or recording and retrieving of data. Referring to FIG. 13, system 1300 resembles system 400A in FIG. 7. When the frame selection is being used to reduce the storage size of the images the images can be stored to be retrieved at a later stage. The system 1300 has a sending unit such as sending unit 200C in FIG. 8 or 200D in FIG. 11, which stores or records selected frames 215 in FIG. 8 or enhanced frames 545 in FIG. 11 on a storage medium 700. Further enhanced frames 545 in FIG. 11 are selected frames 515 which have been reduced by image reducer 535 or enhanced by image enhancer 540. Once stored on storage medium 700 the selected frames 215 can be retrieved by receiving unit 300D in FIG. 12 or 300C in FIG. 9.

As before, storage medium 700 can be a hard disk on or for a computer, digital versatile disc (DVD), magnetic tape or a memory stick or anything else on which digital information can be stored or recorded and retrieved again.

Figure 14:
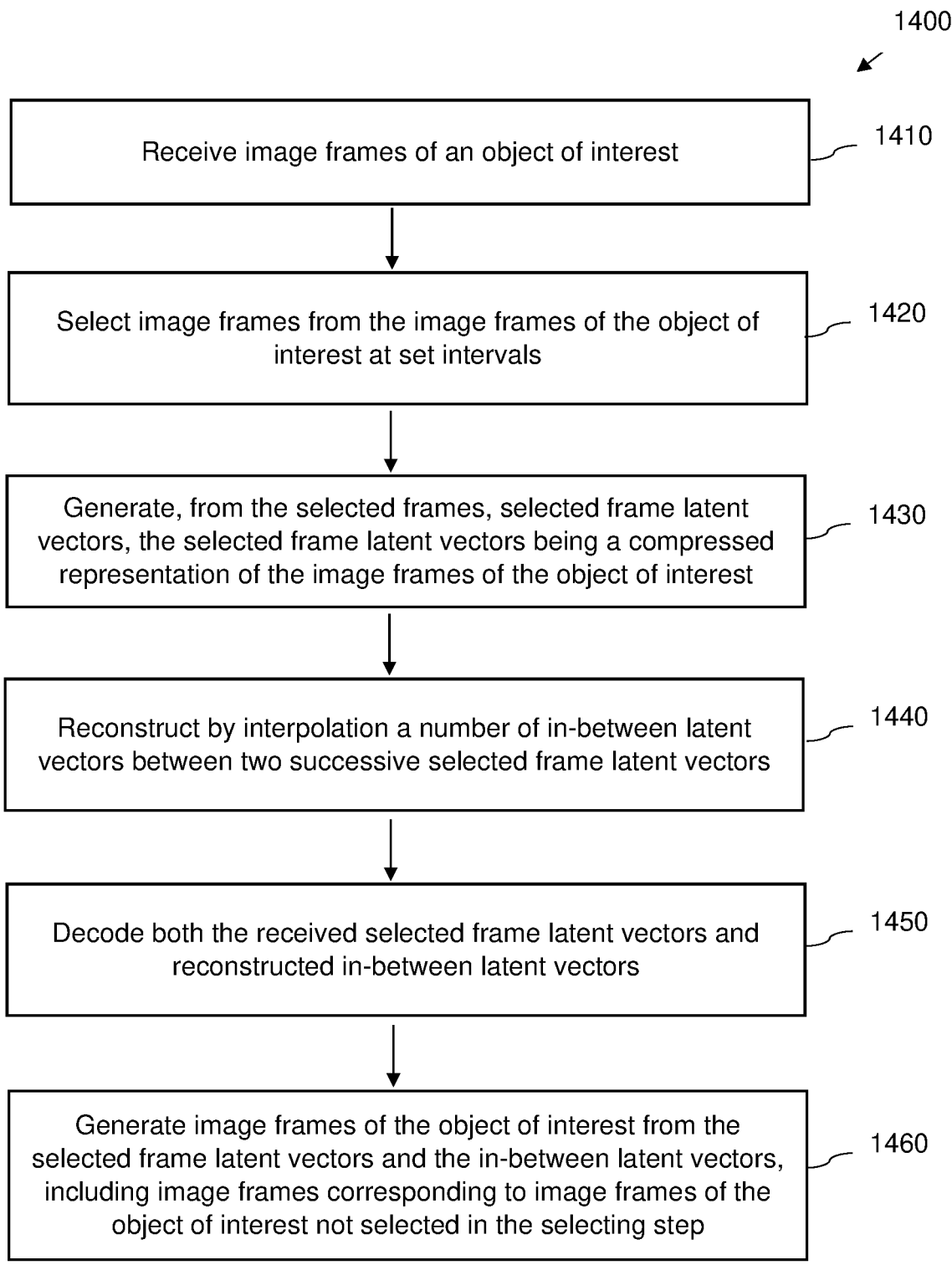
FIG. 14 is a flow diagram of a method according to an embodiment.

FIG. 14 is a flow chart of a method according to an embodiment. The steps of the method 1400 can be performed by a computer system including a sending unit and a receiving unit as described herein, or by other computing devices or systems. At step 1410, a computer system receives image frames of an object of interest. At step 1420, the computer system selects image frames from the images frames of the object of interest at set intervals. At step 1430, the computer system generates, from the selected frames, selected frame latent vectors, the selected frame latent vectors being a compressed representation of the image frames of the object of interest. At step 1440, the computer system reconstructs by interpolation a number of in-between latent vectors between two successive selected frame latent vectors. At step 1450, the computer system decodes both the received selected frame latent vectors and reconstructed in-between latent vectors. At step 1460, the computer system generates image frames of the object of interest from the selected frame latent vectors and the in-between latent vectors, including image frames corresponding to image frames of the object of interest not selected in the selecting step.

During the discussion above, the frame selection rate of the frame selector that was chosen was at a rate of 10 frames per second. This is done only for the purposes of explanation. It should be understood that any frame selection rate falls within the scope of this invention.

It should be understood that methods of implementing the embodiments of this invention also fall within the scope of this invention. Further it should be understood that the embodiments of this invention can be implemented in hardware or software or partially in hardware or partially in software.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system comprising:
   a sending unit comprising a processor and memory, the sending unit configured to receive image frames of an object of interest, the sending unit comprising:
   a frame selector configured to select image frames from the image frames of the object of interest at set intervals; and
   an encoder configured to generate selected frame latent vectors from the selected frames, the selected frame latent vectors being a compressed representation of the selected image frames of the object of interest;
   wherein the sending unit is further programmed to send the selected frame latent vectors to a receiving unit comprising a processor and memory; and
   the receiving unit configured to receive the selected frame latent vectors, the receiving unit comprising:
   an interpolator configured to reconstruct by interpolation a number of in-between latent vectors between two successive selected frame latent vectors;
   wherein the interpolator is configured to send both the received selected frame latent vectors and reconstructed in-between latent vectors to a decoder; and
   the decoder configured to decode both the received selected frame latent vectors and reconstructed in-between latent vectors and generate image frames of the object of interest from the selected frame latent vectors and the reconstructed in-between latent vectors, including image frames corresponding to image frames of the object of interest that were not selected by the frame selector.

2. The system of claim 1, wherein the number of reconstructed in-between latent vectors is the same as the image frames not selected by the frame selector.

3. The system of claim 1, wherein the number of reconstructed in-between latent vectors is not the same as the image frames not selected by the frame selector.

4. The system of claim 1, wherein the receiving unit has an additional latent vector generator configured to generate additional replacement vectors to replace damaged or missing latent vectors not received by the receiving unit.

5. The system of claim 1, comprising a plurality of sending units and receiving units, wherein the plurality of sending units send a corresponding plurality of selected frame latent vectors to the plurality of receiving units via a selective forwarding unit (SFU), the SFU being configured to:
   receive the plurality of selected frame latent vectors;
   select which of the receiving units to send the plurality of selected frame latent vectors;
   and forward the corresponding latent frame latent vectors to the selected receiving units.

6. The system of claim 1, wherein the sending unit further comprises an image enhancer configured to enhance an image of the image frames.

7. The system of claim 6, wherein the image enhancer is further configured to enhance the image by:
   detecting the object of interest in the image frames; and
   upscaling the object of interest in size in the sending unit, wherein such upscaling comprises an increase in resolution of the object of interest in the image frames; and
   wherein the receiving unit is further configured to receive the image frames with the upscaled object of interest and downscale the upscaled object of interest.

8. The system of claim 1, wherein the sending unit further comprises an image reducer configured to reduce an image size of an image frames.

9. The system of claim 8, wherein the image reducer is further configured to reduce the image size by removing background from the image frames.

10. The system of claim 8, wherein the image reducer is further configured to reduce the image size by separating the object of interest and background in the frames; and
  performing higher resolution compression on the object of interest in each image frame and performing lower resolution compression on the background in each image frame, thereby achieving a reduction in the image size.

11. A method performed by a computer system comprising one or more computing devices including a processor and memory, the method comprising:
  receiving image frames of an object of interest;
  selecting image frames from the image frames of the object of interest at set intervals;
  generating, from the selected frames, selected frame latent vectors, the selected frame latent vectors being a compressed representation of the image frames of the object of interest;
  reconstructing by interpolation a number of in-between latent vectors between two successive selected frame latent vectors;
  decoding both the received selected frame latent vectors and reconstructed in-between latent vectors; and
  generating image frames of the object of interest from the selected frame latent vectors and the in-between latent vectors, including image frames corresponding to image frames of the object of interest that were not selected in the selecting step.

12. The method of claim 11, wherein the number of generated in-between latent vectors is the same as the frames not selected.

13. The method of claim 11, further comprising reducing the image size of the image frames by removing background from the image frames.

14. The method of claim 11, further comprising:
  reducing the image size by separating the object of interest and background in the frames; and
  performing higher resolution compression on the object of interest in each image frame and performing lower resolution compression on the background in each image frame, thereby achieving a reduction in image size.

15. The method of claim 11, further comprising enhancing the image of the image frames by:
  detecting an object of interest in the image frames;
  upscaling the object of interest in size, wherein such upscaling comprises an increase in the resolution of the object of interest in the image frame; and
  downscaling the upscaled object of interest.

16. The method of claim 11, comprising implementing a plurality of sending units and receiving units, wherein the plurality of sending units send a corresponding plurality of selected frame latent vectors to the plurality of receiving units via a selective forwarding unit, the selective forwarding unit being configured to:
  receive the plurality of selected frame latent vectors;
  select which receiving units to send the plurality of selected frame latent vectors; and
  forward the corresponding latent frame latent vectors to the selected receiving units.

17. A non-transitory computer-readable storage medium storing instructions that, when executed by one or more processors of a computer system, cause the computer system to perform operations comprising:
  receiving image frames of an object of interest;
  selecting image frames from the image frames of the object of interest at set intervals;
  generating, from the selected frames, selected frame latent vectors, the selected frame latent vectors being a compressed representation of the image frames of the object of interest;
  reconstructing by interpolation a number of in-between latent vectors between two successive selected frame latent vectors;
  decoding both the received selected frame latent vectors and reconstructed in-between latent vectors; and
  generating image frames of the object of interest from the selected frame latent vectors and the in-between latent vectors, including image frames corresponding to image frames of the object of interest that were not selected in the selecting operation.

\* \* \* \* \*